US012654396B2

(12) United States Patent
Deffenbaugh et al.

(10) Patent No.: US 12,654,396 B2
(45) Date of Patent: Jun. 16, 2026

(54) PUMP FOR ADDITIVE MANUFACTURING

(71) Applicant: Sciperio, Inc, Orlando, FL (US)

(72) Inventors: Paul I. Deffenbaugh, Orlando, FL (US); Michael W. Owens, Orlando, FL (US); Kenneth H. Church, Orlando, FL (US); Joshua Goldfarb, Orlando, FL (US); Emily Sassano, Orlando, FL (US)

(73) Assignee: Sciperio, Inc, Orlando, FL (US)

( * ) Notice: Subject to any disclaimer, the term of this patent is extended or adjusted under 35 U.S.C. 154(b) by 104 days.

(21) Appl. No.: 18/430,937

(22) Filed: Feb. 2, 2024

(65) Prior Publication Data

US 2024/0262036 A1      Aug. 8, 2024

Related U.S. Application Data

(60) Provisional application No. 63/483,175, filed on Feb. 3, 2023.

(51) Int. Cl.
| | |
|---|---|
| *B29C 64/321* | (2017.01) |
| *B33Y 30/00* | (2015.01) |
| *F04C 2/16* | (2006.01) |
| *F04C 14/24* | (2006.01) |

(52) U.S. Cl.
CPC .............. *B29C 64/321* (2017.08); *F04C 2/16* (2013.01); *F04C 14/24* (2013.01); *B33Y 30/00* (2014.12); *F04C 2210/44* (2013.01); *F04C 2220/24* (2013.01); *F04C 2240/81* (2013.01); *F04C 2270/585* (2013.01)

(58) Field of Classification Search
CPC ... B29C 64/321; B29C 64/106; B29C 64/209; F04C 14/24; F04C 2210/44; F04C 2220/24; F04C 2240/81; F04C 2270/585
See application file for complete search history.

(56) References Cited

U.S. PATENT DOCUMENTS

| | | | |
|---|---|---|---|
| 6,986,739 | B2 | 1/2006 | Warren |
| 7,857,756 | B2 | 12/2010 | Warren |
| 2015/0112472 | A1* | 4/2015 | Chen ..................... B29C 64/393 |
| | | | 700/119 |
| 2017/0122322 | A1* | 5/2017 | Zinniel ................ B29C 64/321 |
| 2018/0243988 | A1* | 8/2018 | Lewicki ............... B29C 64/245 |
| 2020/0147875 | A1* | 5/2020 | Asgeirsson ........... B29C 64/112 |
| 2023/0294358 | A1* | 9/2023 | Anthony ................ B22F 10/14 |
| | | | 425/375 |

* cited by examiner

*Primary Examiner* — Galen H Hauth
*Assistant Examiner* — Mohamed K Ahmed Ali
(74) *Attorney, Agent, or Firm* — Goodhue, Coleman & Owens, P.C.

(57)                   ABSTRACT

An apparatus may include a pressurized source of viscous material for dispensing onto a substrate. The apparatus may include a progressive cavity pump configured to meter and force material from the material source onward through the apparatus. The apparatus may include a valve operatively connected to the progressive cavity pump and configured to turn on and off flow of material from the progressive cavity pump. Moreover, the device may include an output nozzle for directing the viscous material to the substrate when the valve is in an open position.

21 Claims, 5 Drawing Sheets

PUMP FOR ADDITIVE MANUFACTURING

RELATED APPLICATIONS

This application claims priority to U.S. Provisional Patent Application No. 63/483,175, filed Feb. 3, 2023, hereby incorporated by reference in its entirety.

FIELD OF THE INVENTION

The present invention relates to additive manufacturing. More specifically, but not exclusively, the present invention relates to a direct write print head.

BACKGROUND

There is a need in the art for improvements and enhancements to direct digital manufacturing, including direct write digital manufacturing where materials being written include viscous materials.

SUMMARY

Therefore, it is a primary object, feature, or advantage to improve over the state of the art.

It is a further object, feature, or advantage to enhance direct digital manufacturing.

It is a still further object, feature, or advantage to provide increased control over direct write digital manufacturing including where viscous materials are used.

A further object, feature, or advantage is to provide a direct write print head or tool for viscous materials which allows for fine lines or large area printing.

Another object, feature, or advantage is to combine a servo valve with a servo progressive cavity pump.

Yet another object, feature, or advantage is to provide fine control of segment beginnings and endings as well as flow rate during line printing or area filling.

It is another object, feature, or advantage to provide direct write printing technologies compatible with both viscous materials and fine feature control.

Another object, feature, or advantage is to allow for any electromechanical device to move the valve such as voice coil, motor, piezo, or others.

A further object, feature, or advantage is to have sensor feedback associated with the electromechanical device to move the value such that the sensor feedback may be used in controlling the position.

A still further object, feature, or advantage is to use the valve as a sensor to sense the resistance or viscosity change or the material flowing.

Another object, feature, or advantage is to use the progressive cavity to monitor the material volume flowing.

One or more of these and/or other objects, features, or advantages will become apparent from the specification and claims that follow. No single embodiment need exhibit each and every object, feature, or advantage as different embodiments may have different objects, features, or advantages. The present invention is not to be limited by these objects, features, or advantages.

According to one aspect, an apparatus includes a print head or tool that may mount on an XYZ or 5/6 axis motion system for patterning control. The apparatus may include a syringe of material which is pressurized with air to transport material. A servo motor driven progressive cavity pump pushes material to the nozzle and regulates the flow rate.

According to another aspect, a servo motor controlled valve opens and closes to control at what locations in the pattern material is dispensed, deposited, and printed. For dot printing, the valve positioning, speed, and acceleration are controlled by software to create ideal dots according to dot diameter, height, volume, and material viscosity requirements. The progressive cavity pump is not capable of such fine dynamic control alone. The valve controls the quality of the beginning and end of each line or fill area in such a way to neither deposit too much material nor omit any material from the print.

According to another aspect, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, an apparatus may include a pressurized source of viscous material for dispensing onto a substrate. The apparatus may also include a progressive cavity pump configured to meter and force material from the material source onward through the apparatus. The apparatus may furthermore include a valve operatively connected to the progressive cavity pump and configured to turn on and off flow of material from the progressive cavity pump. The apparatus may in addition include an output nozzle for directing the viscous material to the substrate when the valve is in an open position. Other embodiments of this aspect include corresponding computer systems, apparatus, and computer programs recorded on one or more computer storage devices, each configured to perform the actions of the methods.

Implementations may include one or more of the following features. The apparatus may include an actuator operatively connected to the valve for actuating the valve. The actuator may be selected from a set including a motor, a voice coil, a pneumatic cylinder, and a piezoelectric actuator. The actuator may be configured to retract material from the output nozzle as the valve transitions to a closed position. The apparatus may include a plurality of sensor for sensing parameters associated with operation of the apparatus. The sensing parameters may include parameters from a set including air pressure of a piston used in actuating the valve, current of a motorized piston associated with the pressurized source, torque of the motorized piston associated with the pressurized source, and force of the motorized piston associated with the pressurized source. The sensing parameters may include parameters from a set including air pressure of a piston used in actuating the valve, current of a motorized piston associated with the pressurized source, torque of the motorize piston associated with the pressurized source, and force of the motorized piston associated with the pressurized source. The sensing parameters include parameters from a set including source material pressure, temperature of the source material, viscosity of the source material, and rheology associated with the source material.

According to another aspect, an apparatus for additive manufacturing includes a pressurized source of viscous material for dispensing onto a substrate, a servo-controlled progressive cavity pump configured to meter and force material from the material source onward through the apparatus, a servo-motor-controlled valve operatively connected to the progressive cavity pump and configured to turn on and off flow of material from the progressive cavity pump, an output nozzle for directing the viscous material to the substrate when the valve is in an open position, and a control system operative connected to the servo-controlled progressive cavity pump and the servo-controlled valve configured to control amount of material dispensed from the output nozzle before, during, and ending each segment of feature written with the viscous material onto the substrate.

DETAILED DESCRIPTION

A direct write print head or tool is provided which may be used for viscous material and may be used to direct write fine line areas or provide large area printing. The direct write print head uses a progressive cavity pump and may use closed loop pressure and flow control.

Figure 1:
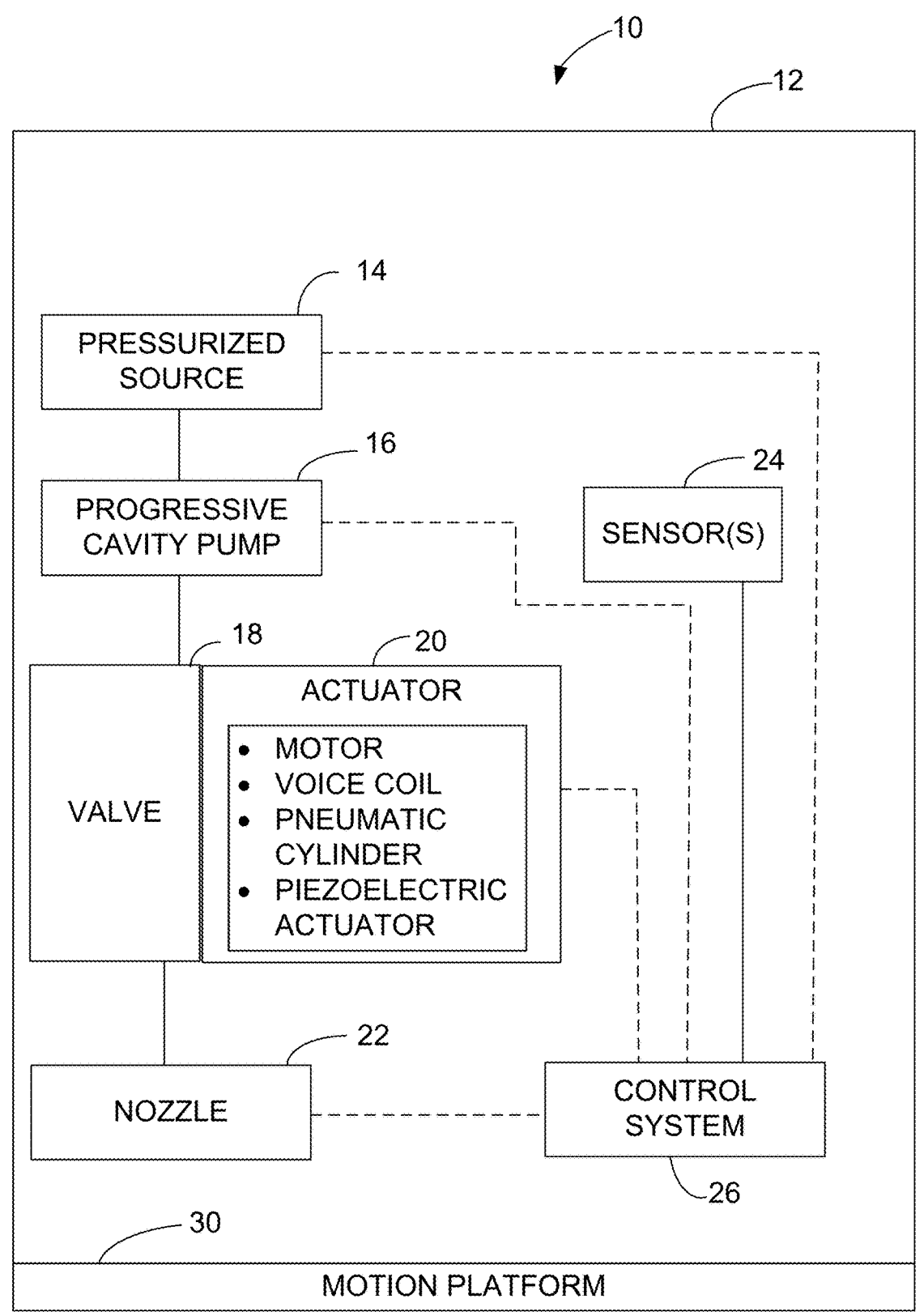
FIG. 1 is a block diagram of one example of a system.

FIG. 1 illustrates one example of a system 10 with an apparatus 12 for additive manufacturing. The apparatus 12 for additive manufacturing includes a pressurized source which is fluidly connected to a progressive cavity pump 16 which is operatively connected to a valve 18 which is operatively connected to a nozzle 22. The apparatus 12 may also generally be referenced as a direct write print head or tool.

The pressurized source 14 may be a pressurized source for material to be directly written including material which is viscous in nature. The pressurized source 14 may include a syringe with air pressurizing a piston forcing material forward or a motorized piston forcing material forward. Of course, this is only representative as other types of pressurized sources may be used. The material itself may be of any number of different types and may be conductive in nature, it may be dielectric in nature, it may be biological in nature, it may be loaded with particles. The progressive cavity pump uses positive displacement as material flows through fixed cavities. The progressive cavity pump may include a machine rotor which may be controlled with an actuator such as a motor such as a servo-motor. With each revolution of the machine rotor a fixed volume of material.

An actuator 20 may be operatively connected to the valve 18 to transition the valve 18 between an open position and a closed position. Sensors 24 may be operatively connected to control system 26 which may be used to monitor and control the apparatus 12 as will be further explained.

A motion platform 30 may be operatively connected to the apparatus 12. The motion platform 30 may provide for movement along any number of different motion axes, including motion axes of 3, 4, 5, 6, or more different directions. Thus, in operation, the nozzle 22 may be precisely positioned in order to direct write desired features onto the substrate or in free space including lines or other patterns.

The valve 18 may be controlled by an actuator 20 which may be operatively connected to a control system 26. The actuator 20 may be a motor, a voice coil, a pneumatic cylinder, a piezoelectric actuator or other type of actuator. The actuator 20, which can turn on and off the flow of material out of the progressive cavity pump 16 and which when closed can slightly retract or "suck-back" material from the output nozzle 22.

The output nozzle 22 may be of the type shown and described in U.S. Pat. Nos. 6,986,739 and/or 7,857,756, which are hereby incorporated by reference in their entireties.

Figure 2:
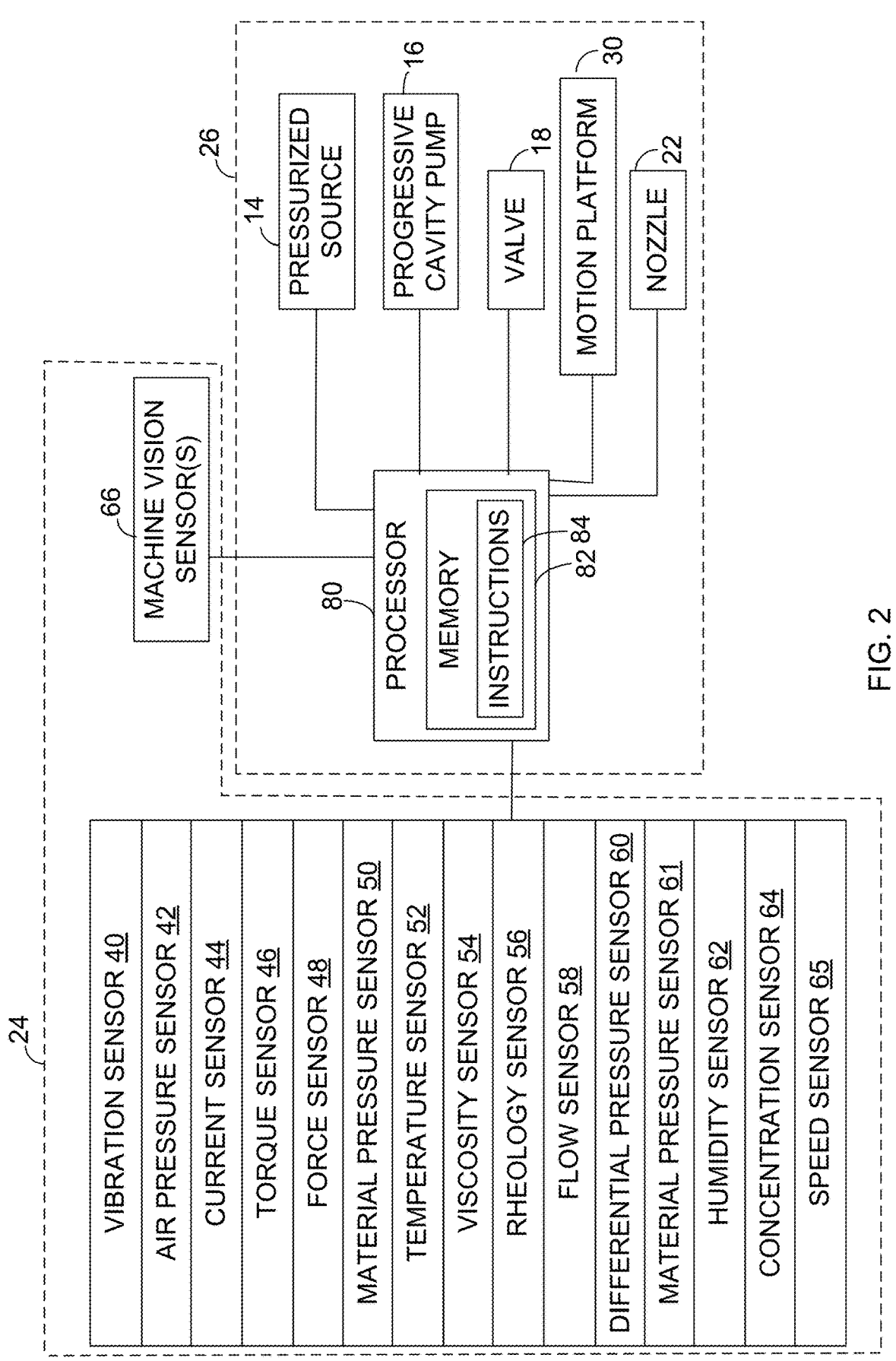
FIG. 2 is a block diagram illustrating the control system in more detail.

FIG. 2 is a block diagram illustrating the control system 26 in more detail as well as examples of sensors 24 which may be present. The control system 26 may include one or more processors 80 with access to a memory 82 which may store one or more instructions which may be executed by the one or more processors 80. The instructions may provide for reading or interpreting sensor parameters from the various sensors. In addition, the instructions may provide for controlling the system such as by controlling actuators associated with the pressurized source 14, the progressive cavity pump 16, the valve 18, the nozzle 22, or the motion platform 30. The motion platform 30 may have its own control system and interface in which case the control system 26 may communicate with the motion platform 30 through its interface. Other aspects of the system may also have their own communications interfaces.

Various types of sensors 24 are shown. It is to be understood that any number of different sensors may be used. Thus, for example, only a subset of the sensors shown may be present. In addition, although only a single sensor of each type is shown, it is to be understood that additional sensors may be present of each type and that where multiple sensors of the same sensor type are present they may be positioned in different locations and may be used to provide sensor parameters relevant to different operations or functions of the apparatus.

For example, a vibration sensor 40 is shown which may be used to measure vibration of the apparatus or its environment. Although various types of vibration sensors may be used, one or more accelerometers may be used as a vibration sensor 40. An air pressure sensor 42 is shown. One use of an air pressure sensor 42 is to sense air pressure of a piston in the material source which is used to force material forward. This is an example of direct sensing. Other examples of sensors may include a current sensor 44, a torque sensor 46, and a force sensor 48. Where a motorized piston is used for forcing material forward in the pressurized source, a current sensor, torque sensor, and/or force sensor may be used to provide relevant sensor parameters for monitoring operation of the pressurized source. For example, the force sensor 48 may be used to measure the force exerted by the pressurized source on the piston. The force sensor 48 may include a load cell or a force transducer to measure force on the piston and then the force information may be used to infer the pressure of the pressurized source 14. Where a torque sensor 46 is used, the torque sensing parameter may be used to infer the pressure of the pressurized source based upon a correlation between torque and pressure. Where a current sensor is used to measure current flowing through an actuator such as a motor, the current sensing parameter may be used to infer the pressure of the pressurized source based upon a correlation between current and pressure. Thus, it should be understood that any number of different sensors may be used to monitor operation of the pressurized source 14 and that the sensor parameters may be provided directly or through inference. It should also be understood that the same types of sensors may also be used to monitor operation of the progressive cavity pump. A speed sensor 65, the torque sensor 46, current sensor 44, or differential pressure sensor 60 may also be used to monitor operation of the progressive cavity pump 16. Similarly, valve speed, force, or differential pressure may be measured.

Other examples of sensors which may be used include a material pressure sensor 50, a temperature sensor 52, a viscosity sensor 54, and a rheology sensor 56. The viscosity sensor 54 may be associated with any number of types of viscometers. The material pressure sensor 50 may be used to measure pressure directly or indirectly. The temperature sensor 52 may be of any number of different types. The rheology sensor 56 may be used to measure viscosity or other properties of the material.

Further examples of sensors which may be include a flow sensor 58 which may be used to measure flow rate of the material. A differential pressure sensor 60 may be present which may be used to infer flow rate. A material pressure sensor 61 may also be used such as to measure pressure inside of the output nozzle 22 or elsewhere. In addition, a humidity sensor 62 may be used to measure humidity. A concentration sensor 64 may be used to measure concentration such as concentration of a volatile organic compound within the material.

Although various examples of sensors have been described, it is to be understood that any number of different sensors of different types may be present. Depending upon the desired sensing parameters to be measured or the particular operations of the apparatus to be monitored, different sensors may be used and sensors may be positioned in different locations throughout the apparatus such as to monitor operation of the pressurized source 14, the progressive cavity pump 16, the valve 18, the output nozzle 22 or other aspects of the apparatus or its environment. Also, it is to be understood that parameters may be measured directly or may be inferred from other parameters alone or in combination with characteristics of the apparatus and/or its operation and/or its environment.

According to another aspect, machine vision sensors 66 may be used. The machine vision sensors 66 may be of any type of machine vision sensors. For example, the machine vision sensors may include one or more imaging sensors such as charge-coupled device (CCD) sensors, complementary metal-oxide semiconductor (CMOS) sensors, infrared (IR) sensors, stereo vision sensors, time-of-flight (ToF) sensors, LIDAR sensors, ultrasonic sensors, structured light sensors, or other types of sensors which may use electromagnetic energy emission or detection directly or indirectly to describe an object, its position, or its properties.

The one or more processors 80 may include one or more microprocessors, digital signal processors, microcontrollers, or other types of processors. The instructions 84 executed by the one or more processors 80 may provide for monitoring any number of sensors, interpreting data from the one or more sensors which in some instances may include inferring measurements from measured sensor parameters. The instructions 84 may also provide for performing sensor fusion where measurements from multiple different sensors are combined in order to provide enhanced insight into operation of the apparatus or to enhance accuracy of sensor measurements by understanding relationships between different sensor measurements, the physical characteristics of the apparatus, the characteristics of the material, the environment, or through other relationships.

The control system 26 includes those aspects of the pressurized source 14, the progressive cavity pump 16, the valve 18, and output nozzle 22 which may be controlled through instructions 84 by the one or more processors 80. This may include controlling actuators such as actuator position, actuator speed, duty cycles or other control operations to control motors, pumps, valves, switches or other electronically actuated controls. This may include controlling voltage or current associated with the apparatus. This may include controlling position of various aspects of the apparatus through interfacing with the motion platform 30.

The valve 18 may be a servo motor controlled valve which opens and closes to control at what locations in the pattern material is dispensed, deposited, and printed. For dot printing, the valve positioning, speed, and acceleration may be controlled by software instructions 84 to create ideal dots according to dot diameter, height, volume, and material viscosity requirements. The progressive cavity pump 16 alone provides limited dynamic control and is not as precise as used in combination with the valve 18. The valve 18 controls the quality of the beginning and end of each line or fill area in such a way to neither deposit too much material nor omit any material from the print. The software may include instructions for coordinating patterning motion with the valve position and progressive cavity pump speed to flow the correct amount of material before, during, and ending each segment.

In some embodiments, closed loop algorithms may be implemented by the one or more processors 80 based on data from the sensors 24, sensor fusion, and/or other available data in order to control and stabilize the print process. In addition to sensor parameter measured directly or indirectly, analysis of machine vision data sensed with the machine vision sensors 66, data from the motion platform 30, available data may also include machine configuration data, material property data or other data which may affect operation of the apparatus.

The algorithms may take into account or compensate for changes in material properties over time and estimate changes in flow rate. Changes in material properties over time may be based on the specific type of materials and their characteristics, temperature, humidity, flow rates at a previous time, and other data in addition to sensor parameters. In some examples, the algorithms may be based on correlations with previously observed flow rates.

Where machine vision algorithms are used, the machine vision algorithms may use as input sensor parameters and be used to control operation of the apparatus including position of the valve 18 which may be actuated by a motor, voice coil, pneumatic cylinder, or piezoelectric actuator. Thus, the valve 18 may be turned on and off to control flow of material from the progressive cavity pump.

The machine vision algorithms may be used to monitor material flow within the apparatus or out of the nozzle and detecting the volumetric flow rate in real time in order to provide enhanced valve opening and closing. The machine vision algorithms may be used to control and measure the dimensions of deposited lines or other features. The machine vision algorithms may be used to detect errors such as bubbles or material inconstancies or material contamination and then trigger automatic corrective actions. The machine vision algorithms may perform image segmentation, object detection, image registration, 3D reconstruction, image processing and may implement machine learning in order to extract data or build models for use in control of the apparatus.

This may include monitoring position relative to a substrate where material is being directly written onto the substrate or in free space proximate the substrate. The substrate may be of any number of different types, shapes, or geometries. In some embodiments, the substrate may be a part of an object or part being manufactured of any number of different sizes, shapes, materials, including with complex circuitry, multiple layers, and any number of different features. The substrate surface need not be planar in nature but may be conformal or of any number of other shapes or complex geometries. Data from the machine vision algorithms may be coupled or combined with data from other sensors to control valve positions, actuators, speeds, duty cycles or otherwise.

Figure 3:
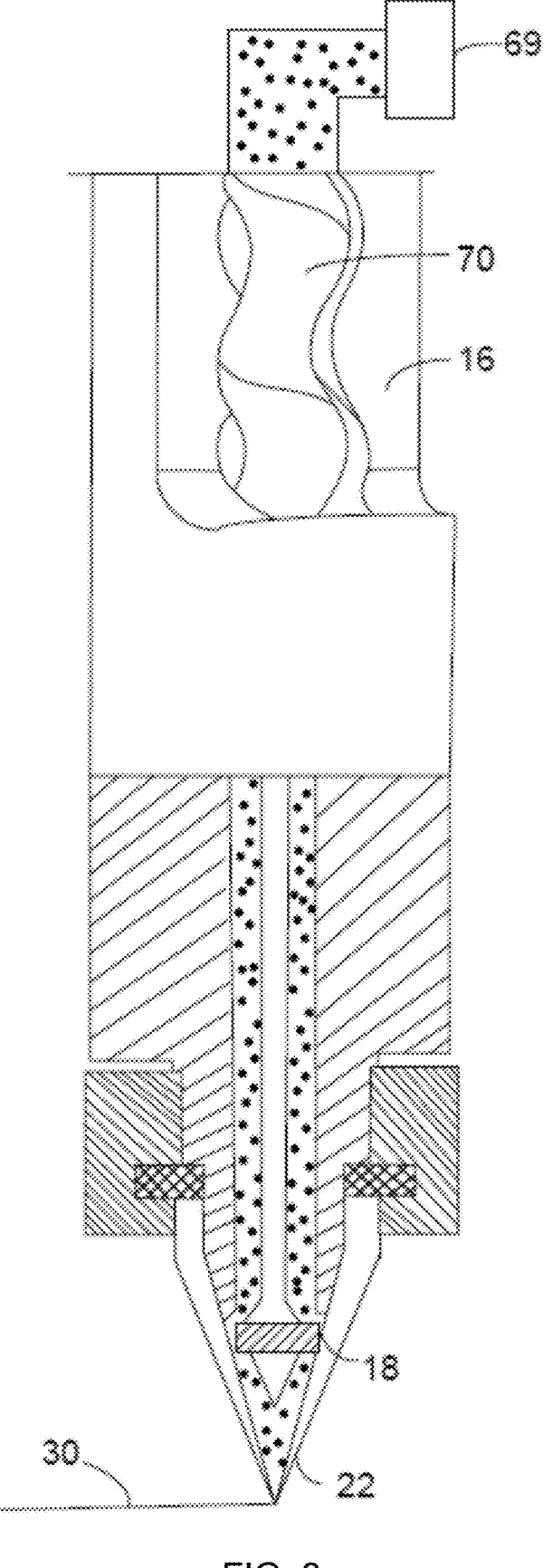
FIG. 3 is a pictorial representation of an apparatus.

FIG. 3 further illustrates one example of an output nozzle 22 which receives a flow of material from a progressive cavity pump 16. The progressive cavity pump 16 uses positive displacement as material flows through fixed cavities. A rotor 70 may be servo-controlled and may displace a fixed volume of material per revolution thereby allowing for consistent volume being dispensed. Thus, the apparatus may precisely control the volume of material being delivered in addition to controlling a valve to the output nozzle 22.

Thus, the apparatus may include a print head or tool that may mount on an XYZ or 5/6 axis motion system for patterning control. The apparatus may include a syringe of material which is pressurized with air to transport material. An inlet 69 is shown for receiving materials. A progressive cavity pump 16 may be used to push material to the nozzle 22 and regulates the flow rate. The progressive cavity pump 16 may be a servo-motor driven pump.

The nozzle 22 can be made from ceramics, polymers, or metals for best material compatibility. Nozzles may have inside tip diameters from 0.01 mm to 1 mm and are designed with a thin wall at the tip for the smallest possible outside diameter. Tips are tapered to ensure best flow for high viscosity materials. Some materials such as ceramics and metals may have relatively high viscosities making them unsuitable for conventional techniques. In addition, materials may be modified with different types of additives which may increase viscosity. Generally, materials which are more viscous are harder to extrude. Thus, the apparatus shown and described is particularly advantage for high viscosity materials including materials up to 1,000,000 cP viscosity.

Figure 4:
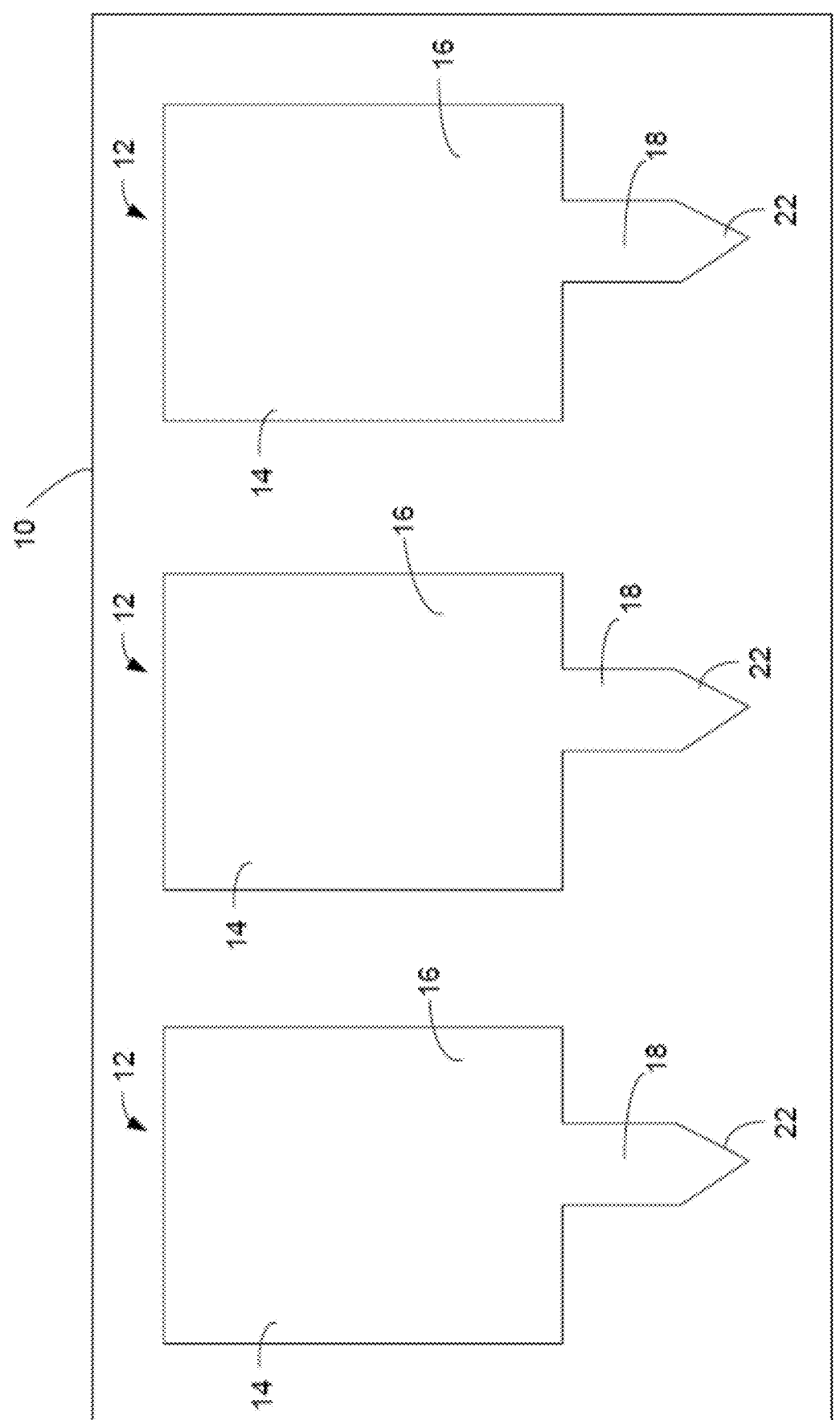
FIG. 4 is a block diagram showing multiple direct write print heads or tools on a single apparatus.

FIG. 4 illustrates multiple print heads as a part of the same system 10. It is to be understood that more than one print heads may be installed on one machine for higher throughput and/or more material choices in one print. Materials are chosen for properties such as electrical or thermal conductivity, resistivity, dielectric, adhesion, or mechanical strength.

Figure 5:
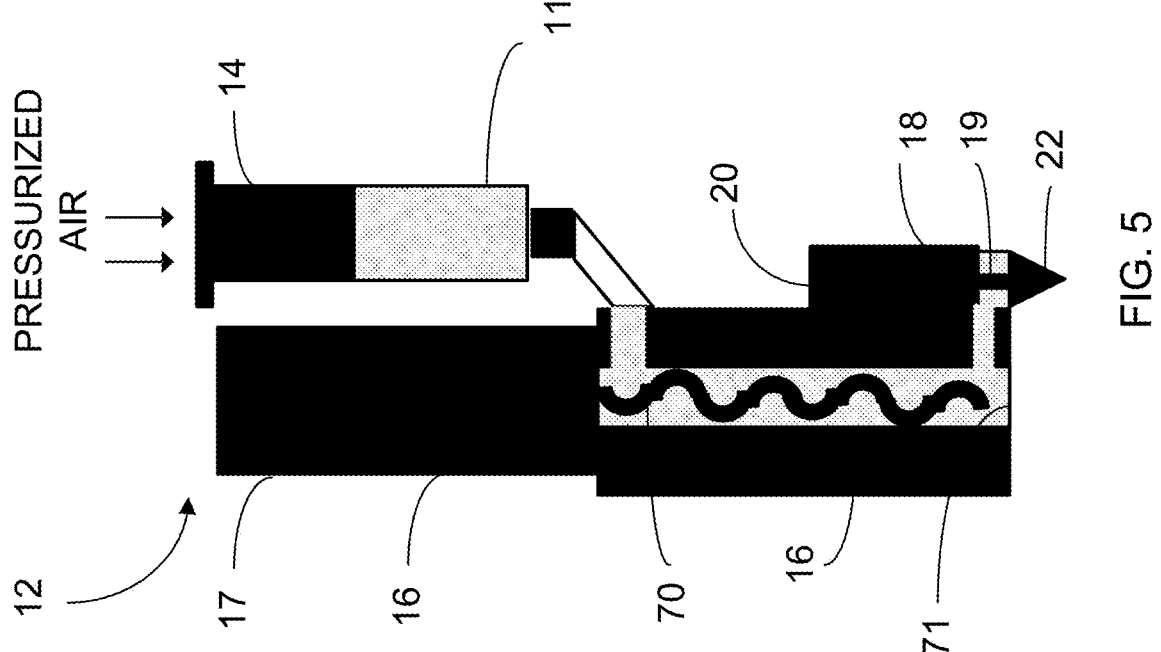
FIG. 5 is another representation of the apparatus.

FIG. 5 illustrates another example of the apparatus 12 for additive manufacturing. A rotor 70 in the form of a progressive cavity auger is shown within the cavity 71. A motor 17 is also shown which may be used for driving the rotor 70. A nozzle 22 in the form of a pen tip is shown. A valve 18 is shown which may include an actuator 20 such as a voice coil. However, any number of other types of electromechanical devices may be used to move the value. The valve 18 may have a valve rod 19. Under pressure, material 11 may 11 may be provided into the cavity 71 and conveyed by the rotor such as an auger towards the valve 18, where the material 11 may be dispensed from the pen tip or nozzle 22. Sensors as previously discussed may be associated the actuator 20 to move the valve 18 in a manner such that sensor feedback may be used in controlling valve position. In addition, the valve may be used to sense the resistance or viscosity change of the material flowing. Thus, by measuring an electrical property associated with a sensor associated with a valve, resistance or viscosity change of the material may be measured.

Another object, feature, or advantage is to use the progressive cavity to monitor the material volume flowing.

The disclosure is not to be limited to the particular aspects described herein. In particular, the disclosure contemplates numerous variations in the structure of the apparatus, its configuration, the combination sensors used, the algorithms for monitoring and controlling operation of the direct write tool, the types of materials used, the object and features being fabricated. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of aspects, processes, or methods of the disclosure. It is understood that any other modifications, substitutions, and/or additions can be made, which are within the intended spirit and scope of the disclosure.

What is claimed is:

1. An apparatus for additive manufacturing comprising:
a pressurized source of viscous material for dispensing onto a substrate;
a progressive cavity pump comprising a helical rotor within a pump housing, the progressive cavity pump configured to meter and force material from the pressurized source of the viscous material onward through the apparatus;
a valve operatively connected to the progressive cavity pump and configured to turn on and off flow of material from the progressive cavity pump; and
an output nozzle for directing the viscous material to the substrate when the valve is in an open position;
wherein the progressive cavity pump is servo-controlled and provides positive displacement of a fixed volume of the viscous material per revolution of the helical rotor.

2. The apparatus of claim 1 further comprising an actuator operatively connected to the valve for actuating the valve.

3. The apparatus of claim 2 wherein the actuator is selected from a set comprising a motor, a voice coil, a pneumatic cylinder, and a piezoelectric actuator.

4. The apparatus of claim 3 wherein the actuator is configured to retract material from the output nozzle as the valve transitions to a closed position.

5. The apparatus of claim 1 further comprising a plurality of sensor for sensing parameters associated with operation of the apparatus.

6. The apparatus of claim 5 wherein the sensing parameters include parameters from a set comprising air pressure of a piston used in actuating the valve, current of a motorized piston associated with the pressurized source, torque of the motorized piston associated with the pressurized source, and force of the motorized piston associated with the pressurized source.

7. The apparatus of claim 5 wherein the sensing parameters include parameters from a set comprising source material pressure, temperature of the source material, viscosity of the source material, and rheology associated with the source material.

8. The apparatus of claim 5 wherein the sensing parameters include parameters from a set comprising material flow rate and differential pressure.

9. The apparatus of claim 5 wherein the sensing parameters include parameters from a set comprising vibration, air humidity, and volatile organic compound concentration.

10. The apparatus of claim 1 further comprising a control system operatively connected to the pressurized source, the progressive cavity pump, and the valve and wherein the control system includes a processor for executing instructions stored on a machine readable medium to control operation of the apparatus.

11. The apparatus of claim 10 further comprising a plurality of sensors operatively connected to the control system and wherein the control system is configured to perform at least one indirect measurement using sensor parameters from the plurality of sensors.

12. The apparatus of claim 11 wherein the control system implements closed loop control algorithms based on the sensor parameters and the at least one indirect parameters to actuate one or more actuators of the apparatus.

13. The apparatus of claim 10 wherein the control system is configured to estimate a change in flow rate as material properties change over time.

14. The apparatus of claim 10 further comprising at least one machine vision sensor operatively connected to the control system and wherein the control system is configured to apply a machine vision algorithm to control at least one of the pressurized source, the progressive cavity pump, and the valve.

15. The apparatus of claim 14 wherein the machine vison algorithm is configured to monitor material flow within the apparatus, monitor material flow from the nozzle, and detect volumetric flow rate in real-time.

16. The apparatus of claim 10 further comprising at least one machine vision sensor operatively connected to the control system and wherein the control system is configured to apply a machine vision algorithm to control valve opening and closing.

17. The apparatus of claim 10 further comprising at least one machine vision sensor operatively connected to the control system and wherein the control system is configured to apply a machine vision algorithm to control and measure dimensions of deposited lines or features.

18. The apparatus of claim 10 further comprising at least one machine vision sensor operatively connected to the control system and wherein the control system is configured to apply a machine vision algorithm to detect and correct errors.

19. The apparatus of claim 18 wherein the errors are selected from a set comprising bubbles in material, material inconsistencies, and material contamination.

20. The apparatus of claim 1 further comprising a motion platform for movement relative to the substrate, wherein the motion platform provides for movement along motion axes of at least 3 directions.

21. An apparatus for additive manufacturing comprising:
   a pressurized source of viscous material for dispensing onto a substrate;
   a servo-controlled progressive cavity pump comprising a helical rotor within a pump housing, the servo-controlled progressive cavity pump configured to meter and force material from the material source onward through the apparatus;
   a servo-motor-controlled valve operatively connected to the progressive cavity pump and configured to turn on and off flow of material from the progressive cavity pump;
   an output nozzle for directing the viscous material to the substrate when the valve is in an open position;
   a control system operative connected to the servo-controlled progressive cavity pump and the servo-controlled valve configured to control amount of material dispensed from the output nozzle before, during, and ending each segment of feature written with the viscous material onto the substrate;
   wherein the servo-controlled progressive cavity pump provides positive displacement of a fixed volume of the viscous material per revolution of the helical rotor.

* * * * *